(12) United States Patent
Jung et al.

(10) Patent No.: US 10,827,334 B2
(45) Date of Patent: Nov. 3, 2020

(54) METHOD AND APPARATUS FOR CONNECTING DEVICES USING BLUETOOTH LE TECHNOLOGY

(71) Applicant: LG ELECTRONICS INC., Seoul (KR)

(72) Inventors: Sungwon Jung, Seoul (KR); Donghyun Kang, Seoul (KR); Hyunsik Yang, Seoul (KR); Minsoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/618,725

(22) PCT Filed: Jun. 4, 2018

(86) PCT No.: PCT/KR2018/006370
§ 371 (c)(1),
(2) Date: Dec. 2, 2019

(87) PCT Pub. No.: WO2018/222024
PCT Pub. Date: Dec. 6, 2018

(65) Prior Publication Data
US 2020/0137542 A1 Apr. 30, 2020

Related U.S. Application Data

(60) Provisional application No. 62/514,017, filed on Jun. 2, 2017.

(51) Int. Cl.
*H04W 48/16* (2009.01)
*H04W 4/00* (2018.01)
(Continued)

(52) U.S. Cl.
CPC ............ *H04W 4/80* (2018.02); *H04B 17/318* (2015.01); *H04W 8/005* (2013.01); *H04W 72/10* (2013.01);
(Continued)

(58) Field of Classification Search
None
See application file for complete search history.

(56) References Cited

U.S. PATENT DOCUMENTS 8,358,596 B2 * 1/2013 Byrne .................. H04W 88/06
370/255
8,737,917 B2 * 5/2014 Desai .................. H04W 8/005
455/41.2
(Continued)

FOREIGN PATENT DOCUMENTS

KR 10-0703316 B1 4/2007
KR 10-2011-0048682 A 5/2011
(Continued)

*Primary Examiner* — Tuan A Tran
(74) *Attorney, Agent, or Firm* — Dentons US LLP

(57) ABSTRACT

The present invention relates to a method and an apparatus for connecting adjacent devices using Bluetooth Low Energy (LE). In particular, a method performed in a first device comprises the steps of: receiving an advertisement message from at least one adjacent device, wherein the advertisement message includes information on a content type supported by the at least one adjacent device; transmitting, to the at least one adjacent device, a notification message for notifying a pop-up for a user of the first device on the basis of the advertisement message; and transmitting a connection request message for requesting connection to the at least one adjacent device according to an input of the user.

9 Claims, 21 Drawing Sheets

(51) Int. Cl.

| | | |
|---|---|---|
| *H04W 8/00* | (2009.01) | |
| *H04L 29/06* | (2006.01) | |
| *G06F 15/173* | (2006.01) | |
| *H04W 4/80* | (2018.01) | |
| *H04B 17/318* | (2015.01) | |
| *H04W 76/14* | (2018.01) | |
| *H04W 72/10* | (2009.01) | |
| *H04W 72/12* | (2009.01) | |
| *H04W 84/18* | (2009.01) | |

(52) U.S. Cl.
CPC ....... *H04W 72/1242* (2013.01); *H04W 76/14* (2018.02); *H04W 84/18* (2013.01)

(56) References Cited

U.S. PATENT DOCUMENTS

| | | | | |
|---|---|---|---|---|
| 8,935,411 | B2* | 1/2015 | Palin | H04W 76/14 |
| | | | | 709/227 |
| 9,020,433 | B2* | 4/2015 | Linde | H04W 8/005 |
| | | | | 455/41.2 |
| 9,185,652 | B2* | 11/2015 | Xie | H04W 52/0229 |
| 9,408,147 | B2* | 8/2016 | Polo | H04W 52/0229 |
| 9,497,612 | B2* | 11/2016 | Linde | H04W 8/005 |
| 9,674,048 | B2* | 6/2017 | Cherian | H04W 76/11 |
| 9,723,546 | B2* | 8/2017 | Tomida | H04W 48/16 |
| 9,930,240 | B2* | 3/2018 | Song | H04N 5/23206 |
| 9,949,063 | B2* | 4/2018 | Yong | H04W 48/16 |
| 10,171,592 | B2* | 1/2019 | Qi | H04L 67/16 |
| 10,172,169 | B2* | 1/2019 | Lee | H04W 12/02 |
| 10,182,326 | B2* | 1/2019 | Lee | H04W 4/00 |
| 10,348,952 | B2* | 7/2019 | Ishikuri | H04W 52/0225 |
| 10,390,113 | B2* | 8/2019 | Kwon | H04W 8/005 |
| 10,517,048 | B2* | 12/2019 | Ramappa | H04W 4/021 |
| 10,548,068 | B2* | 1/2020 | Lee | H04W 8/005 |
| 10,652,243 | B2* | 5/2020 | Kwon | H04W 12/08 |
| 2014/0087665 | A1 | 3/2014 | Yang | |
| 2015/0103708 | A1* | 4/2015 | Kang | H04W 52/0235 |
| | | | | 370/311 |
| 2016/0227470 | A1* | 8/2016 | Liu | H04W 52/0219 |
| 2017/0374629 | A1* | 12/2017 | Ramappa | H04W 4/80 |
| 2018/0176776 | A1* | 6/2018 | Knaappila | G06F 21/31 |

FOREIGN PATENT DOCUMENTS

| | | |
|---|---|---|
| KR | 10-2016-0063761 A | 6/2016 |
| WO | 2016/182404 A1 | 11/2016 |

* cited by examiner

【FIG. 1】
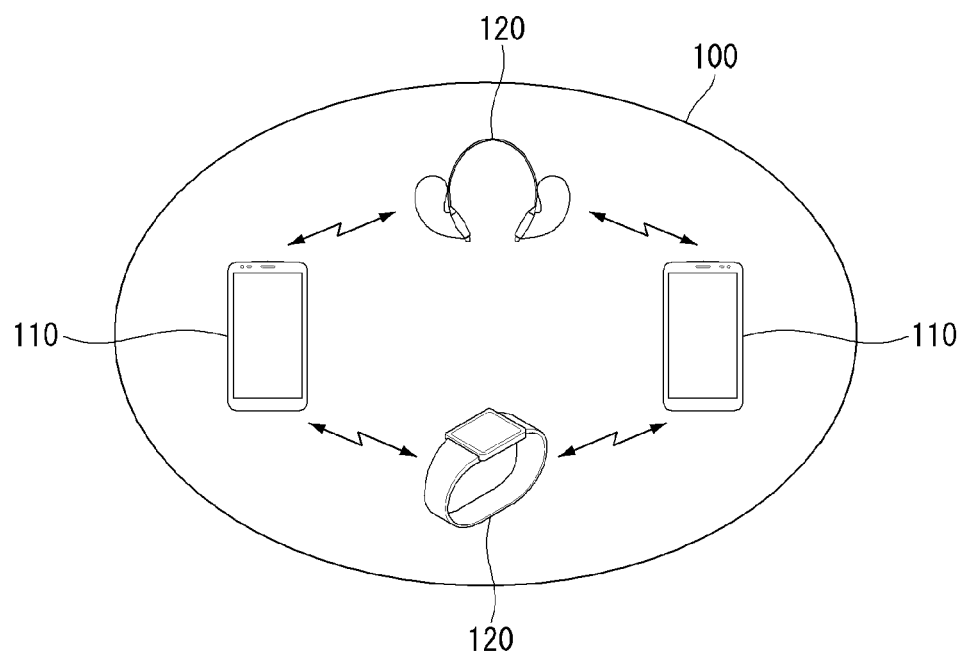

[FIG. 2]
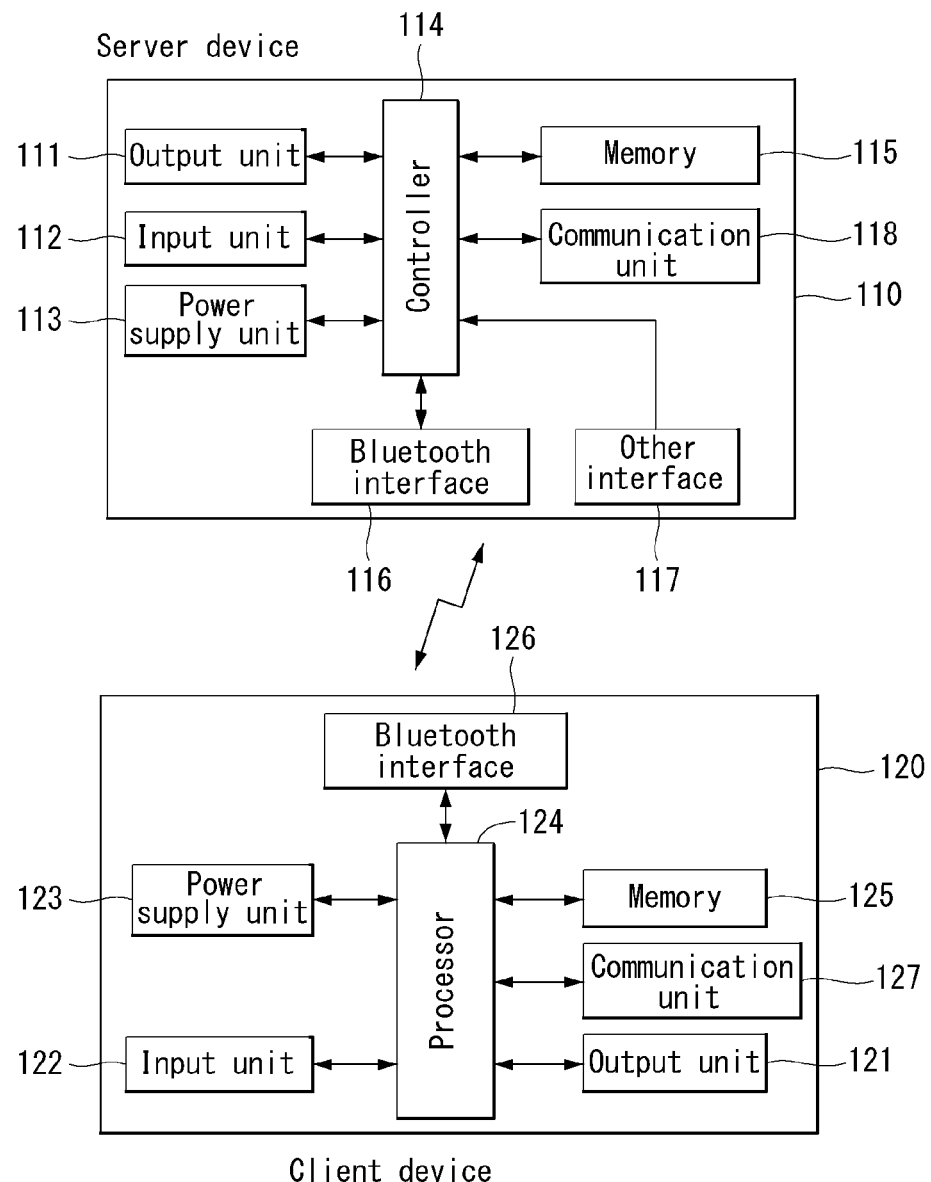

[FIG. 3]
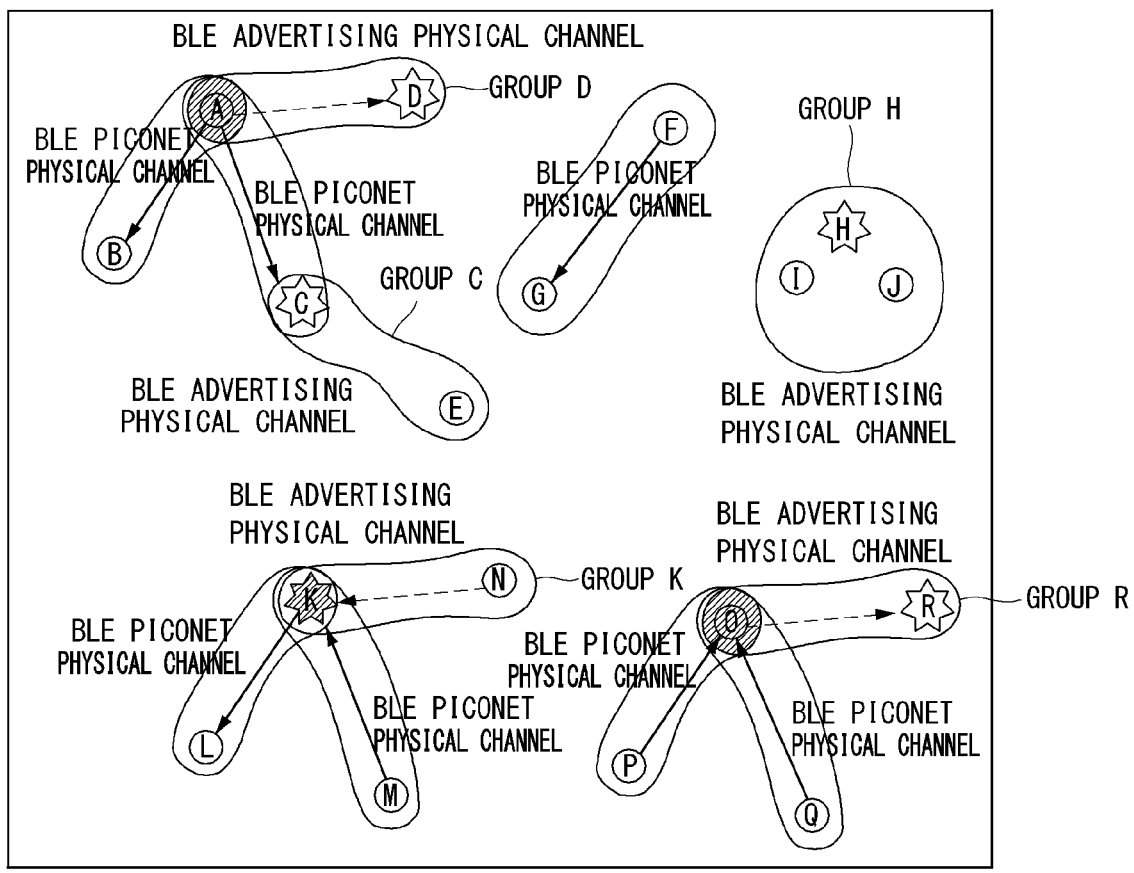

[FIG. 4]
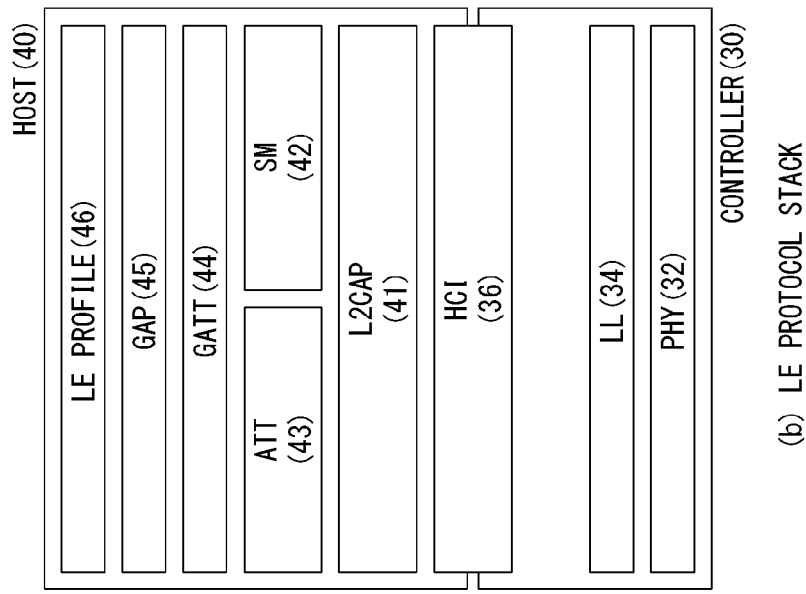
(b) LE PROTOCOL STACK
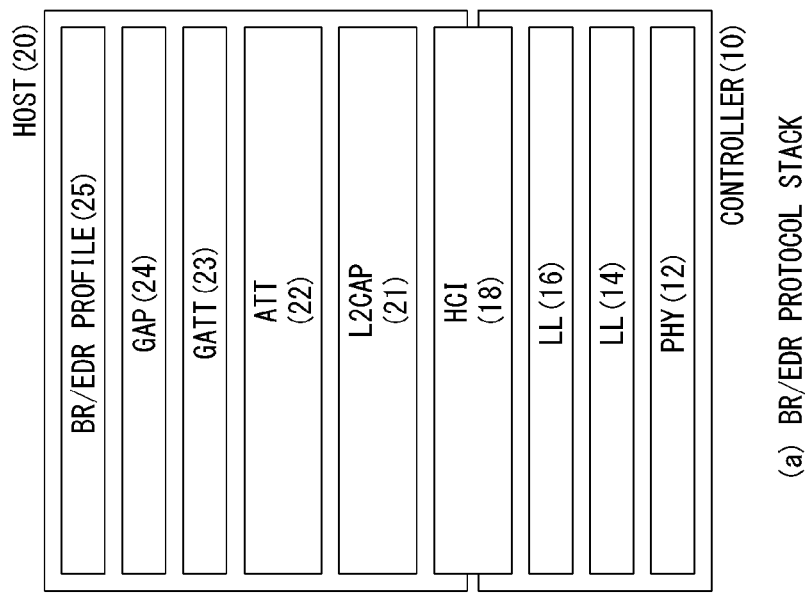
(a) BR/EDR PROTOCOL STACK

[FIG. 5]
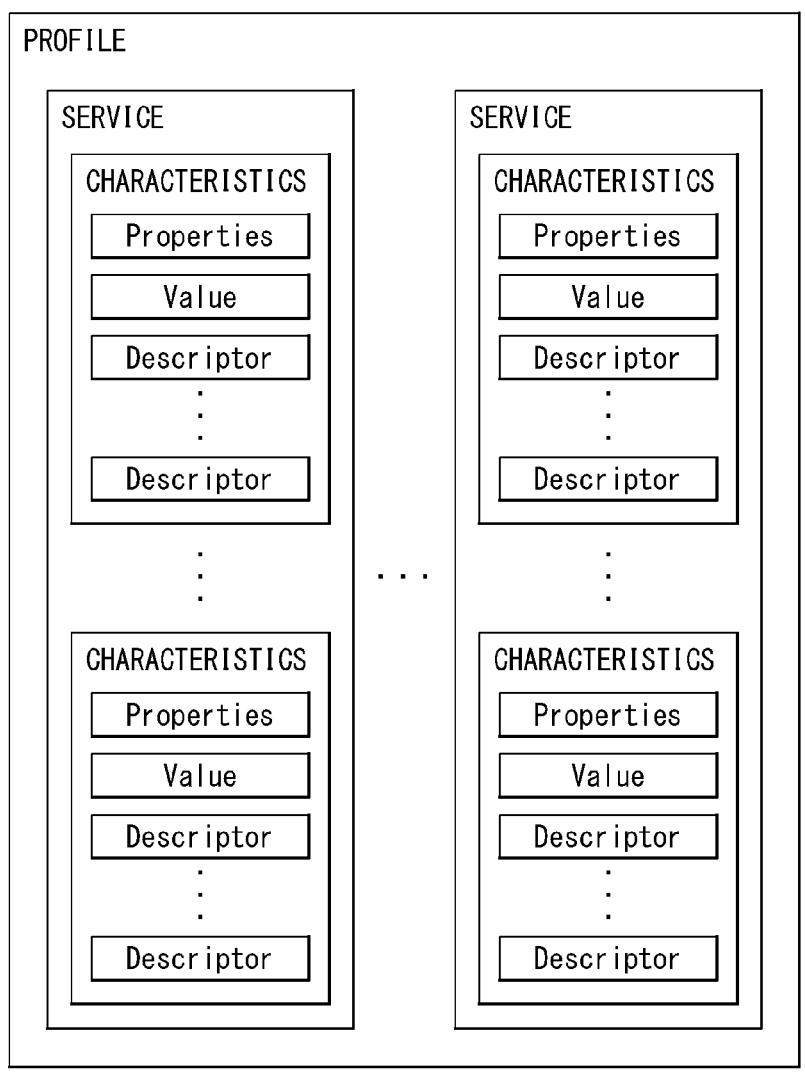

[FIG. 6]
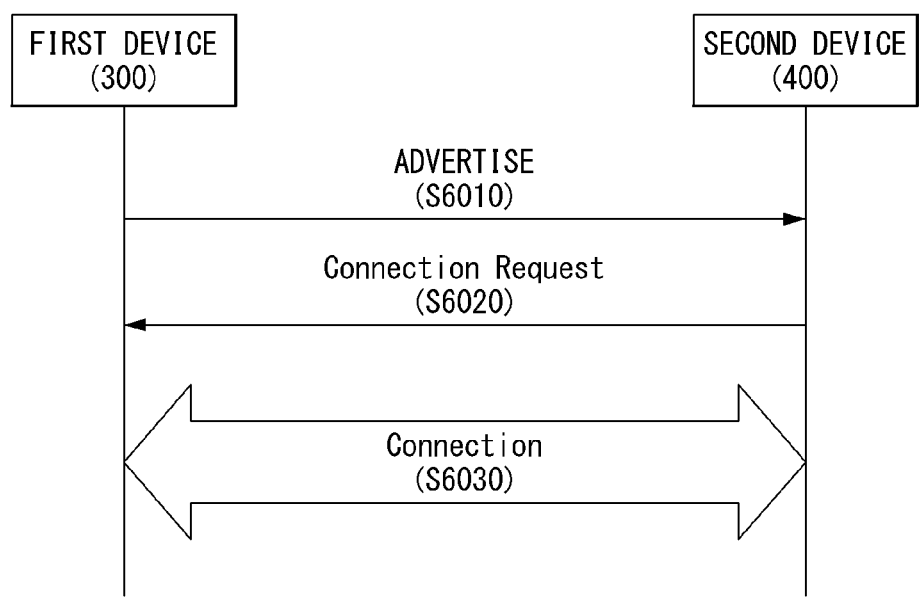

[FIG. 7]
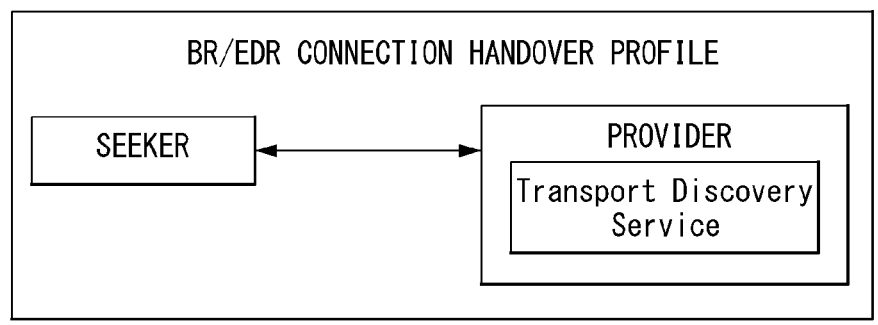

[FIG. 8]

| Field | | Data Type | Size(Octets) | Requirement |
|---|---|---|---|---|
| Transport Discovery Data AD Type Code | | uint8 | 1 | M |
| Transport Block (1 or more) | Organization ID | Uint8 | 1 | M |
| | TDS Flags | 8bit | 1 | M |
| | Transport Data Length | Uint8 | 1 | M |
| | Transport Data | Variable | Variable | O |

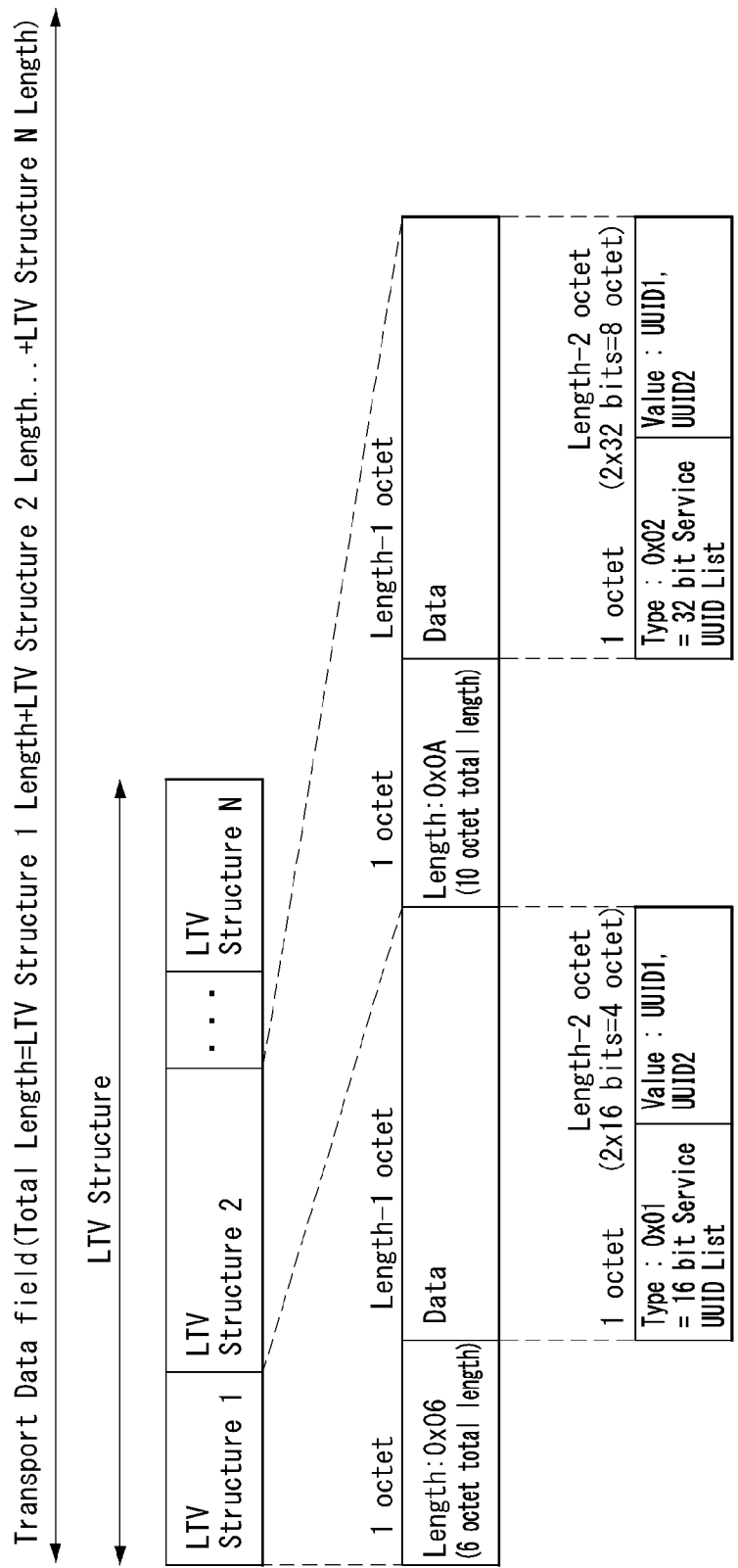
[FIG. 9]

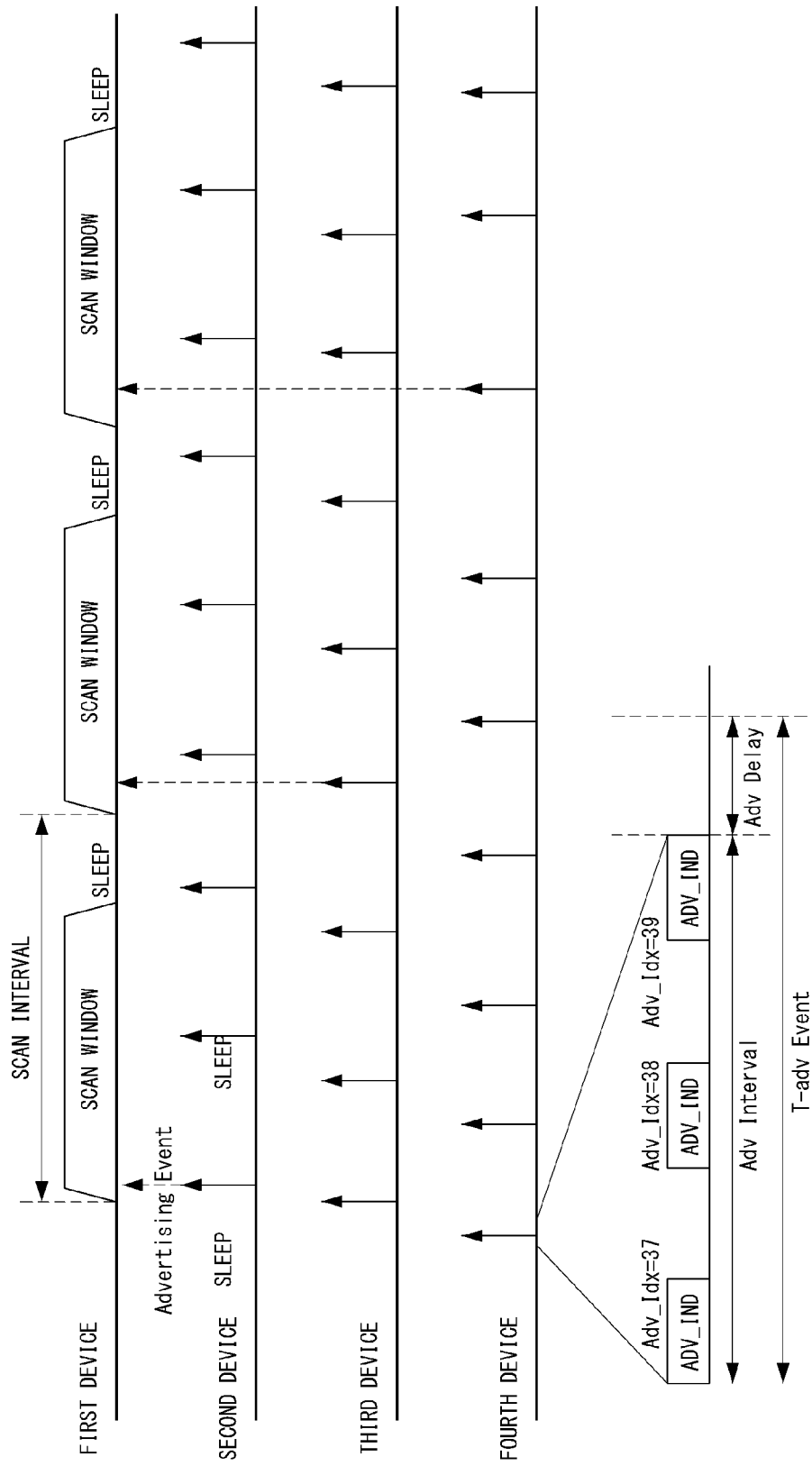
[FIG. 10]

[FIG. 11]
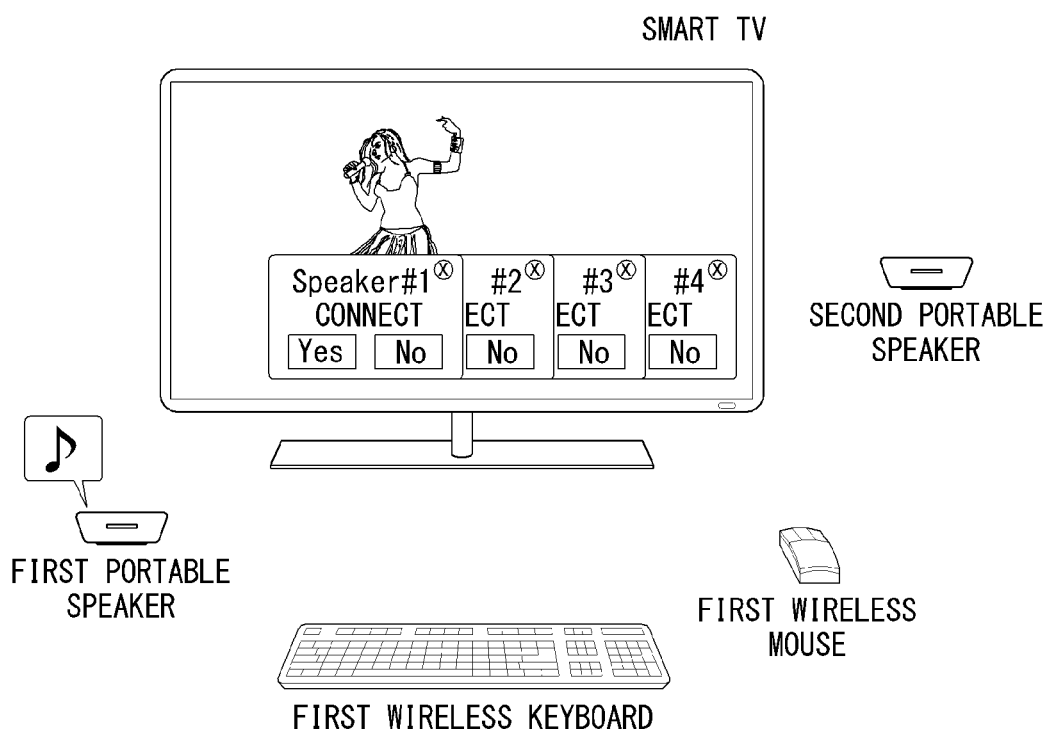

[FIG. 12]
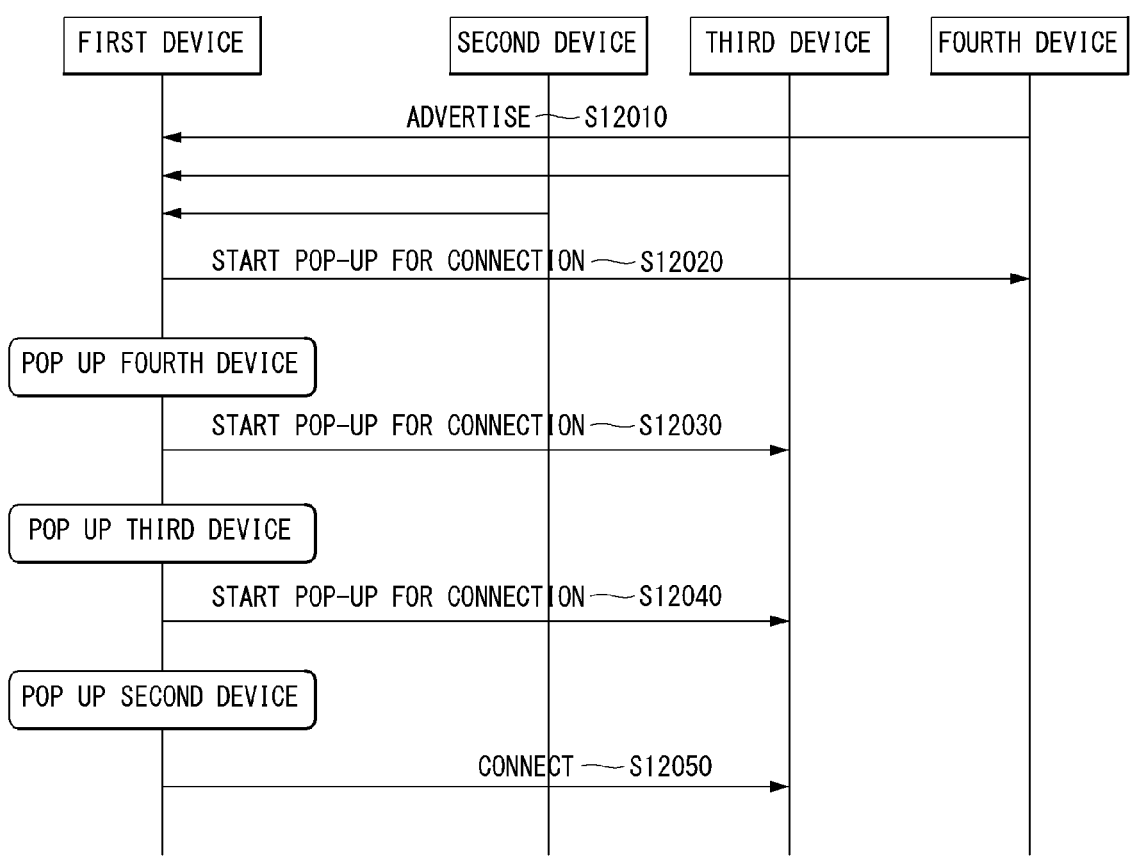

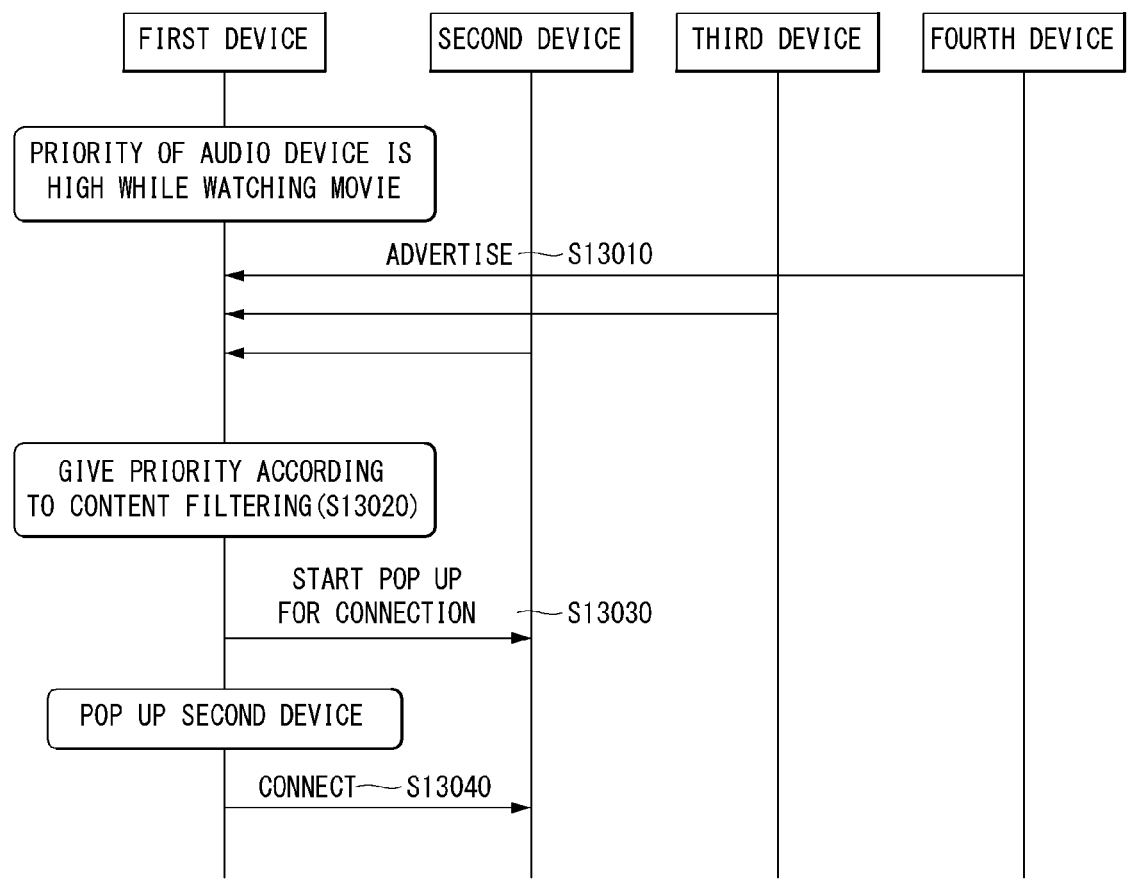
[FIG. 13]

| Field | | Data Type | Size (Octets) | Requirement |
|---|---|---|---|---|
| Transport Discovery Data AD Type Code | | uint8 | 1 | M |
| Transport Block (1 or more) | Organization ID | Uint8 | 1 | M |
| | TDS Flags | 8bit | 1 | M |
| | Transport Data Length | Uint8 | 1 | M |
| | Transport Data | Variable | Variable | O |

(b)

| Type | Contents |
|---|---|
| 0x00 | AUDIO |
| 0x01 | VIDEO |
| 0x02 | INPUT |
| 0x03 | OTHER |
| 0x04 ~ 0xFF | RFU (Reserved for Future Use) |

[FIG. 15]

| Type | length | ID Scheme | Value (SUBSTANTIAL VALUE OF CONTENT) | Description |
|---|---|---|---|---|
| 0x00 | 2 | TVC | TV channel | |
| 0x01 | 2 | SP | Show, presentation | |
| 0x02 | 2 | GP | Game Play | |
| 0x03 | 2 | EI | Extra Input, EXTERNAL INPUT | |
| 0x04 | 2 | DOI | Digital Object identifier | http://www.doi.org |
| 0x05 | 2 | GRID | A global release identifier for a music, video | Exactly 18 alphanumeric characters |
| 0x06 | 2 | ISSN | Serials. ISO 3297:1998. | |
| 0x07 | 2 | ISWC | Musical Works | http://www.ciasc.org |
| 0x08 | 2 | URI | A URI | This allows compatibility with TV Anytime and MPEG-21 |
| 0x09 | 2 | UUID | A UUID | Form 8-4-4-4-12 |
| 0x0a ~ 0xff | | RFU | Reserved for Future Use | |

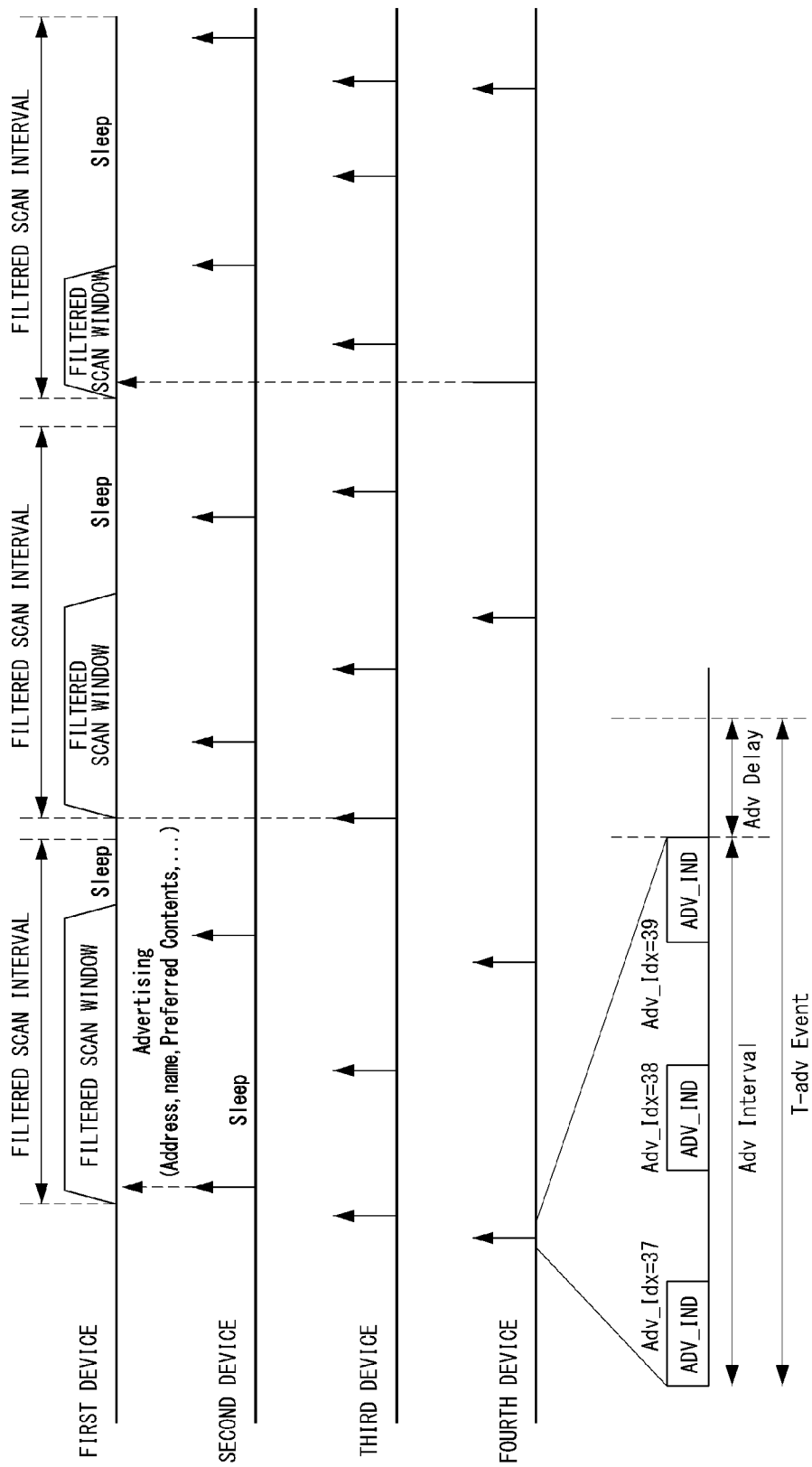
[FIG. 16]

[FIG. 17]
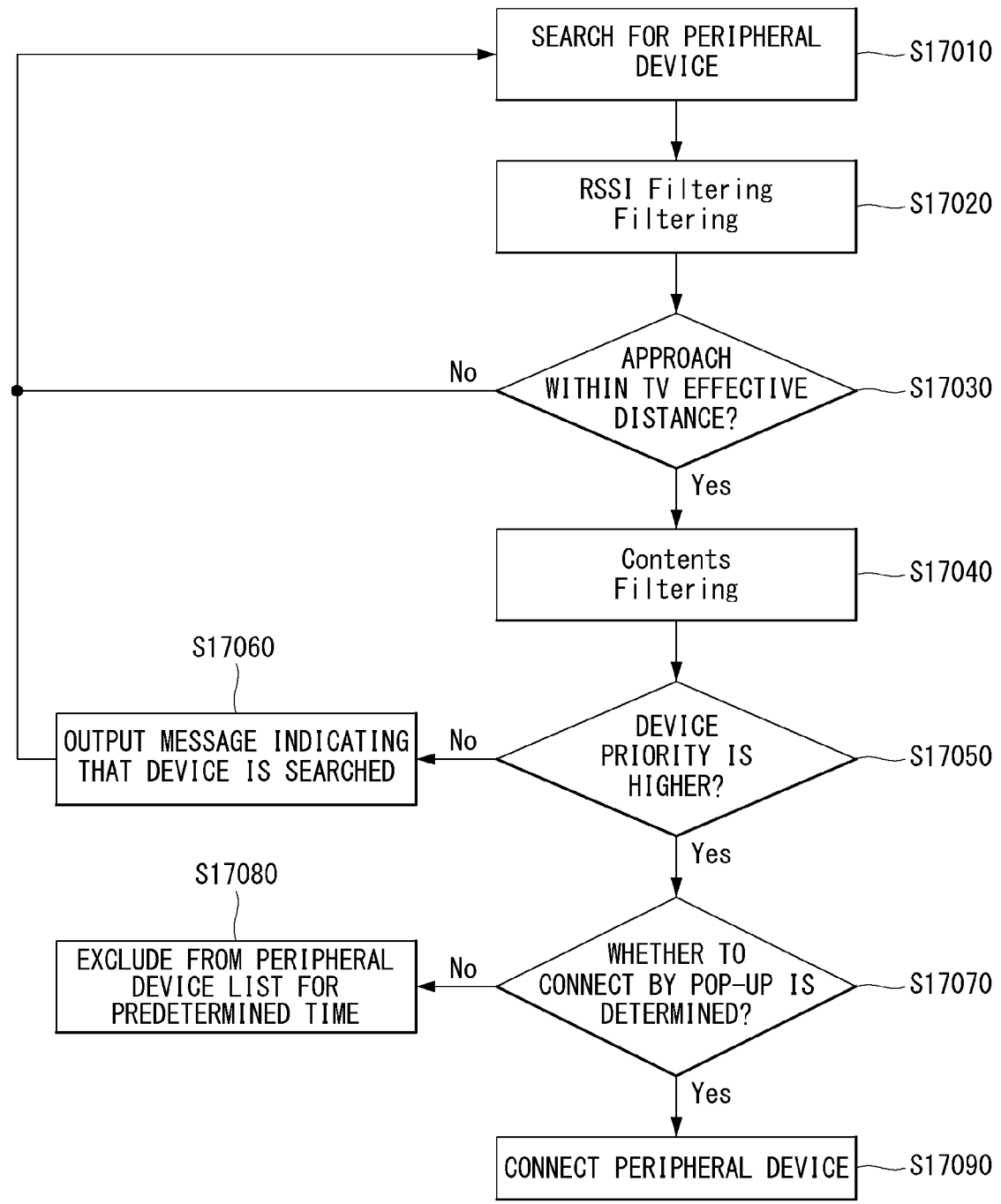

[FIG. 18]
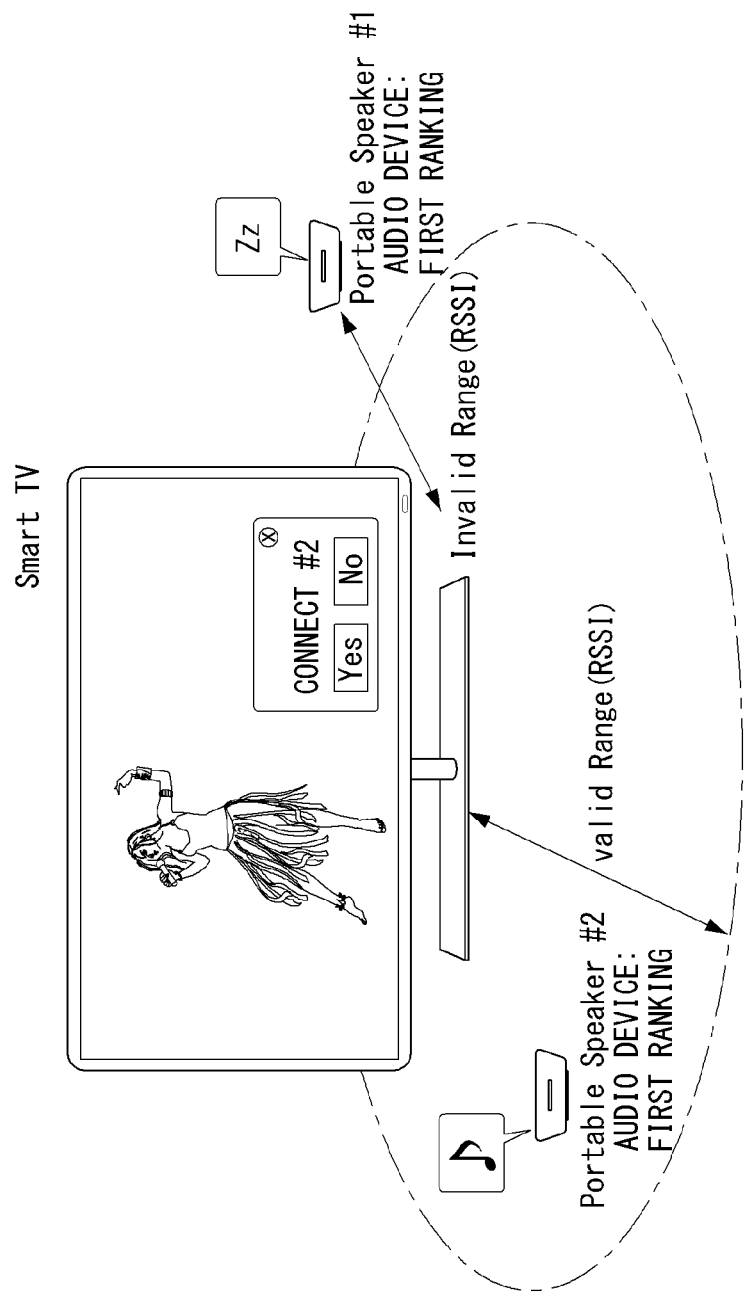

[FIG. 19]
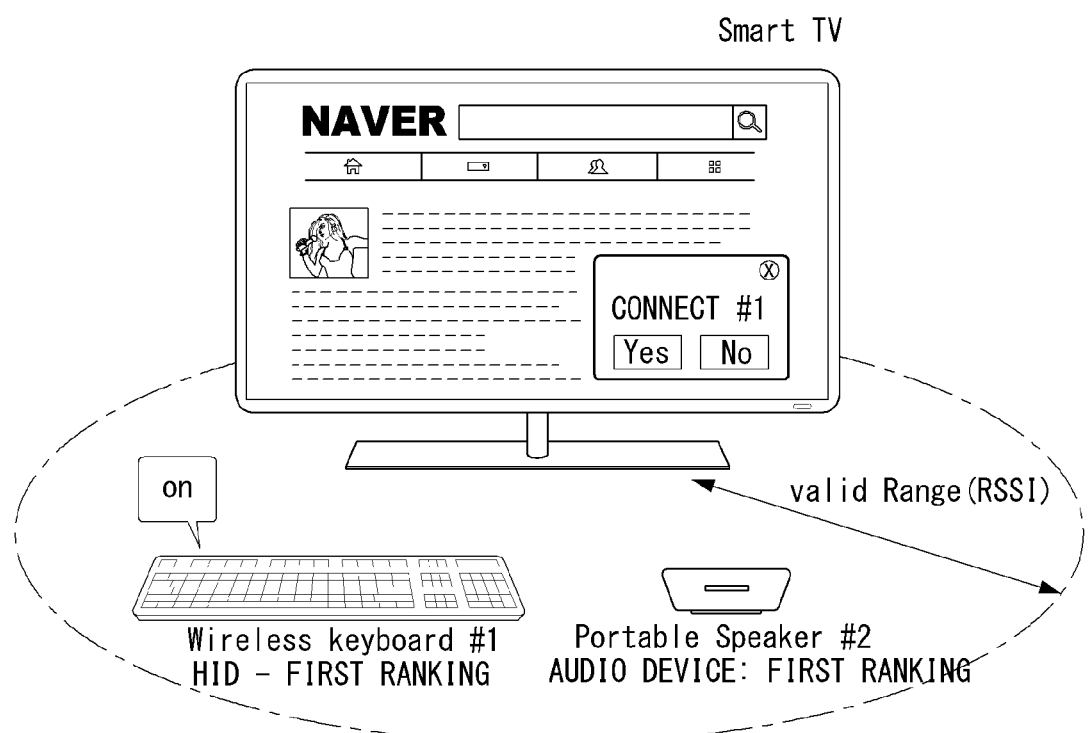

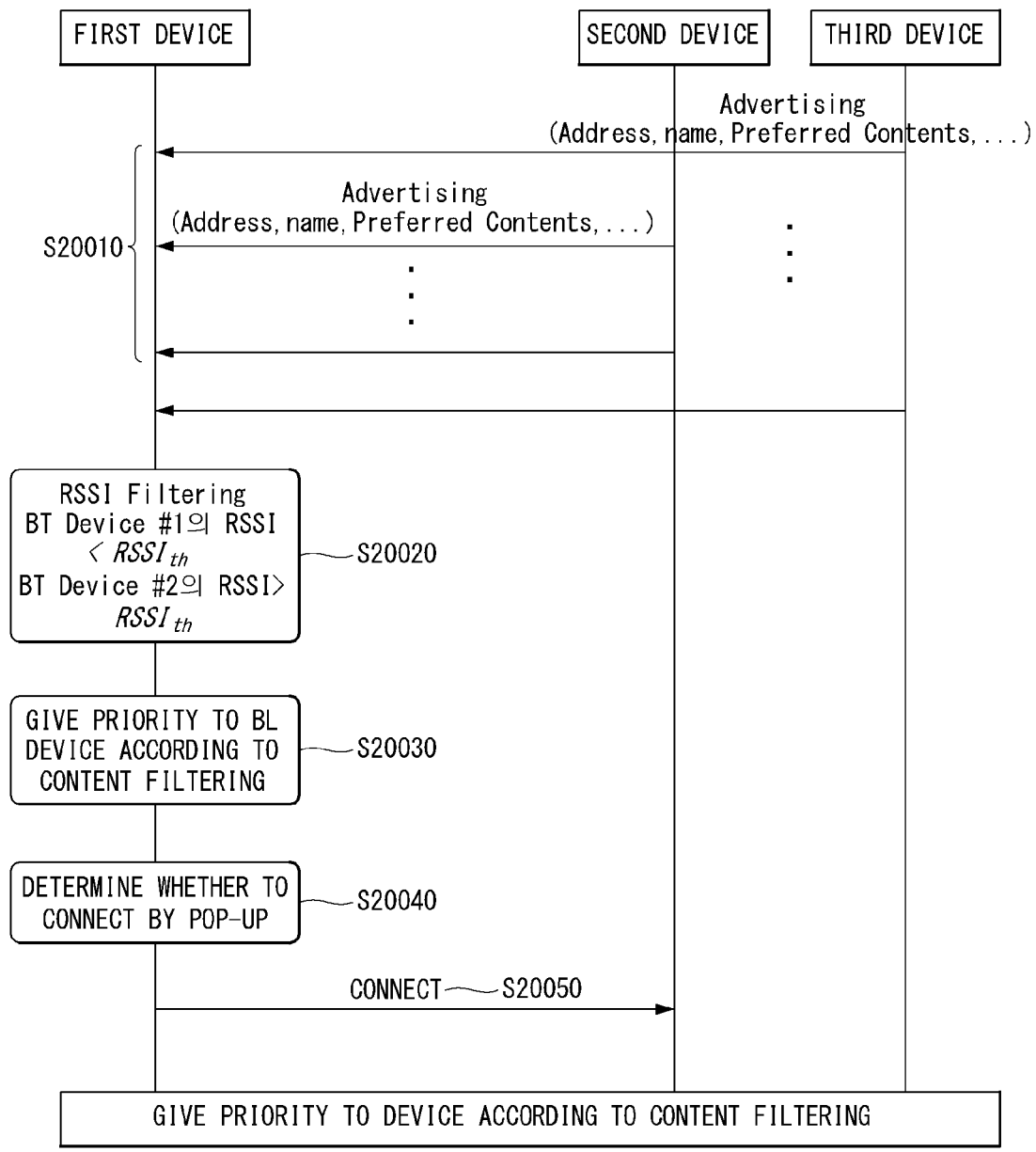

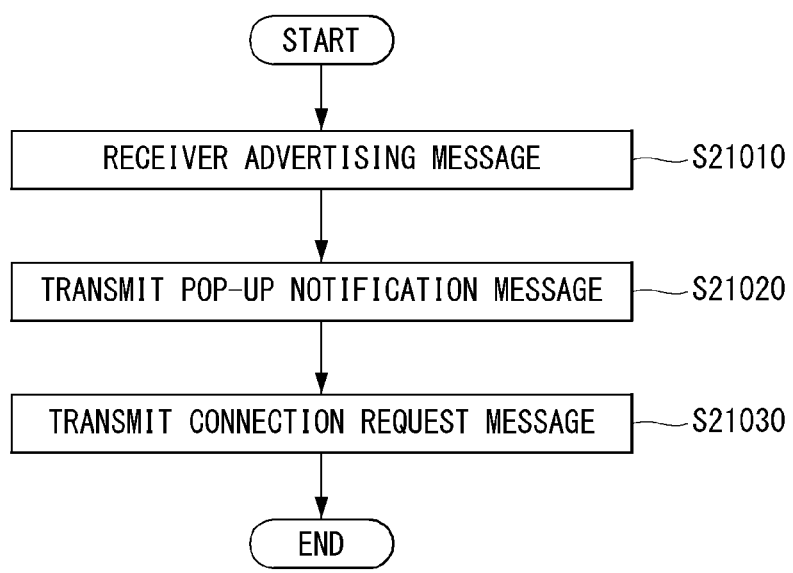
[FIG. 21]

METHOD AND APPARATUS FOR CONNECTING DEVICES USING BLUETOOTH LE TECHNOLOGY

This application is the National Stage filing under 35 U.S.C. 371 of International Application No. PCT/KR2018/006370, filed on Jun. 4, 2018, which claims the benefit of U.S. Provisional Application No. 62/514,017, filed on Jun. 2, 2017, the contents of which are all hereby incorporated by reference herein in their entirety.

TECHNICAL FIELD

The present disclosure relates to a method and apparatus for discovering a device using Bluetooth, a short-range technology, in a wireless communication system, and particularly, to a method and apparatus for connecting devices using Bluetooth low energy (BLE) technology.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

In the existing Bluetooth wireless communication technology, connection information is shown in a pop-up manner each time peripheral devices of a main smart device (e.g., TV, a mobile phone, a smartphone, a laptop computer, etc.) that users mainly use attempt to be connected. As peripheral devices used in main smart devices such as TVs increase, frequent pop-up guide may cause user inconvenience.

An embodiment of the present disclosure provides a method of efficient Bluetooth pairing and notification in an environment in which a plurality of devices exist.

Furthermore, an embodiment of the present disclosure provides a method of connecting a main smart device and a peripheral device more efficiently by redefining information included in an advertising message.

Furthermore, an embodiment of the present disclosure provides a method of applying different scan windows according to priority of peripheral devices.

Furthermore, an embodiment of the present disclosure provides a method of allocating priority according to characteristics of content used in a peripheral device to be connected to a main smart device.

Furthermore, an embodiment of the present disclosure provides a method of transmitting a notification message according to priority given through content filtering.

The objects to be achieved in the present disclosure are not limited to the objects mentioned above, and other objects not mentioned above are apparent to those skilled in the art to which the present disclosure pertains, from the following description.

Technical Solution

An aspect of the present disclosure provides a method of connecting to an adjacent device in a wireless communication system using Bluetooth low energy (LE), the method performed in a first device including: receiving an advertising message from at least one adjacent device, the advertising message including information on a content type supported by the at least one adjacent device; transmitting a notification message for notifying a pop-up for a user of the first device to the at least one adjacent device based on the advertising message; and transmitting a connection request message requesting connection to the at least one adjacent device according to an input of the user.

Preferably, the content type may include audio, video, or an external input.

Preferably, the content type may include a TV channel, a show, a game, an external input, a digital object identifier, music, a global release identifier for video, a serial, music work, URI or UUID information.

Preferably, the method may further include adaptively adjusting a size of a scan window in a scanning state based on a priority determined according to the content type.

Preferably, the method may further include giving priority to the at least one adjacent device based on the content type.

Preferably, the transmitting of the notification message to the at least one adjacent device may include: transmitting, if the advertising message is received from a plurality of devices, a notification message for notifying a pop-up for connection to a device given the highest priority among the plurality of devices to the device given the highest priority.

Preferably, the priority may be determined according to a usage environment of the first device or the content type supported by the at least one adjacent device.

Preferably, the method may further include determining whether the at least one adjacent device approaches within an effective distance range using a received signal strength indicator (RSSI).

Another aspect of the present disclosure provides a first device for connecting with an adjacent device in a wireless communication system using Bluetooth low energy (BLE) including: a communication unit wirelessly or wiredly communicating with an external device; and a processor operatively connected to the communication unit, wherein the processor receives an advertising message from at least one adjacent device, the advertising message including information on a content type supported by the at least one adjacent device, transmit a notification message for notifying a pop-up for a user of the first device to the at least one adjacent device based on the advertising message, and transmit a connection request message requesting connection to the at least one adjacent device according to an input of the user.

Advantageous Effects

According to an embodiment of the present disclosure, by redefining information included in an advertising message, a peripheral device may establish connection more efficiently and user convenience may be improved.

In addition, according to an embodiment of the present disclosure, by applying different scan windows in accordance with priorities of peripheral devices, efficiency of advertising/scanning may be improved and power consumption may be reduced.

In addition, according to an embodiment of the present disclosure, by transmitting a notification message according to a priority given through content filtering, user inconvenience may be prevented in advance.

The effects obtainable herein are not limited to the effects mentioned above, and other effects not mentioned above are clearly understood by those skilled in the art to which the present disclosure pertains, from the following description.

DESCRIPTION OF DRAWINGS

FIG. 1 is a schematic view illustrating an example of a wireless communication system using a Bluetooth low energy technology to which the present disclosure is applicable.

FIG. 2 illustrates an example of an internal block diagram of a device capable of implementing methods proposed by this specification.

FIG. 3 shows an example of a Bluetooth low energy (BLE) topology.

FIG. 4 is a diagram illustrating an example of a Bluetooth communication architecture to which the methods proposed herein may be applied.

FIG. 5 is a diagram illustrating an example of a structure of a generic attribute profile (GATT) of BLE.

FIG. 6 is a flowchart illustrating a method of establishing connection using BLE between devices.

FIGS. 7 to 9 illustrate a transport discovery service (TDS) to which the present disclosure may be applied.

FIG. 10 is a diagram illustrating an advertising and scanning operation in Bluetooth communication according to an embodiment to which the present disclosure may be applied.

FIG. 11 is a diagram illustrating a problem that may arise as various peripheral devices approach in an existing Bluetooth communication technology.

FIG. 12 is a flowchart illustrating a pop-up method according to discovery of a peripheral device in the existing Bluetooth communication technology.

FIG. 13 is a flowchart illustrating a method of discovering and popping up a peripheral device according to an embodiment of the present disclosure.

FIG. 14 is a diagram illustrating an advertising message format according to an embodiment of the present disclosure.

FIG. 15 is a diagram illustrating transport data according to an embodiment of the present disclosure.

FIG. 16 is a diagram illustrating a method of adaptively adjusting a scan window according to an embodiment of the present disclosure.

FIG. 17 is a flowchart illustrating a method of giving priority according to an embodiment to which the present disclosure is applied.

FIGS. 18 to 19 are diagrams showing an example of a usage scenario according to an embodiment of the present disclosure.

FIG. 20 is a flowchart illustrating an example of a usage scenario according to an embodiment of the present disclosure.

FIG. 21 is a diagram illustrating a method of forming a connection through an advertisement including content type information according to an embodiment to which the present disclosure may be applied.

MODE FOR INVENTION

The above purpose, characteristics, and advantages of the present invention will now be described more fully with reference to the accompanying drawings. The invention may, however, be embodied in many different forms and in what follows, particular embodiments of the invention are illustrated in the accompanying drawings and described in detail. Basically, the same reference numbers across the document represent the same constituting elements. In addition, if it is determined that disclosure related to the invention or a specific description about structure of the invention may lead to misunderstanding of the purpose of the invention, the corresponding specific description would be omitted.

Hereinafter, a mobile terminal related to the present invention will be described below in more detail with reference to the accompanying drawings. In the following description, suffixes "module" and "unit" are used only in consideration of facilitating description and do not have meanings or functions discriminated from each other.

FIG. 1 is a schematic view illustrating an example of a wireless communication system using a Bluetooth low energy technology to which the present disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, etc, and the client device 110 may be expressed as a master device, a master, a client, a member, a sensor device, a sink device, a collector, a second device, a third device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notification message and an indication message to the client device in order to provide data information to the client device. In addition, when the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

In addition, there have been a number of devices that measure physical activity of a human being using a specific device, but there has been no device that transmits measured data through Bluetooth to show a specific data value to a user.

Accordingly, in order to solve this problem, the present disclosure proposes a method of measuring physical activity of a human being, transmitting and processing the measured data through a Bluetooth LE, and providing the same to a user.

FIG. 2 illustrates an example of an internal block diagram of a device capable of implementing methods proposed by this specification.

As shown in FIG. 2, the server device includes a display unit 111, a user input interface 112, a power supply unit 113, a processor (or controller) 114, a memory unit 115, a Bluetooth interface 116, another interface 117, and a communication unit (or transmission/reception unit) 118.

The display unit 111, user input interface 112, power supply unit 113, processor 114, memory unit 115, Bluetooth interface 116, another interface 117, and communication unit 118 are functionally interconnected so as to perform a method according to an embodiment of the present disclosure.

Furthermore, the client device includes a display unit 121, a user input interface 122, a power supply unit 123, a processor 124, a memory unit 125, a Bluetooth interface 126, and a communication unit (or transmission/reception unit) 127.

The display unit 121, user input interface 122, power supply unit 123, processor 124, memory unit 125, Bluetooth interface 126, and communication unit 127 are functionally interconnected so as to perform a method according to an embodiment of the present disclosure.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored.

The processor 114, 124 refers to a module for controlling an overall operation of the server device or the client device, and controls the server device or the client device in order in order to request the transmission of a message through the Bluetooth interface or other interface and to process a received message.

The processors 114 and 124 may be represented by a control section, a control unit, a controller, and the like.

The processors 114 and 124 may include an application-specific integrated circuit (ASIC), another chipset, a logic circuit, and/or a data processing device.

The processors 114 and 124 control the communication unit to receive an Advertising message from the server device, transmit a Scan Request message to the server device, control the communication unit to receive a Scan Response message from the server device in response to the scan request, and control the communication unit to transmit a Connect Request message to the server device in order to establish a Bluetooth connection with the server device.

In addition, after a Bluetooth LE connection is established through the connection procedure, the processors 114 and 124 control the communication unit so as to read or write data from or in the server device using an attribute protocol.

The memory units 115 and 125 may include a read-only memory (ROM), a random access memory (RAM), a flash memory, a memory card, a storage medium, and/or other storage devices.

The communication units 118 and 127 may include a baseband circuit for processing a radio signal. When the embodiment is implemented by software, the aforementioned technique may be implemented by a module (a process, a function, and the like) that performs the aforementioned function. The module may be stored in the memory unit and executed by the processor.

The memory units 115 and 125 may be positioned inside or outside the processors 114 and 124 and connected with the processors 114 and 124 by various well-known means.

The display units 111 and 121 refer to modules for providing state information of the device and message exchange information to the user through a screen.

The power supply units 113 and 123 refer to modules that receive external power and internal power under the control of the control unit and supply power required for operating each of the components.

As described above, the BLE technology may have a small duty cycle and significantly reduce power consumption through a low data rate, so that the power supply unit may supply power required for an operation of each component even with a low output power (10 mW (10 dBm) or less).

The input units 112 and 122 refer to modules that provide an input of the user to the controller like a screen button so that the user may control the operation of the device.

FIG. 3 shows an example of a Bluetooth low energy (BLE) topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slave does not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.

1. Device D is an advertiser and device A is an initiator (group D).
2. Device E is a scanner and Device C is an advertiser (group C).
3. Device H is an advertiser, and devices I and J are scanners (group H).
4. Device K is also an advertiser, and device N is an initiator (group K).
5. Device R is an advertiser, and device O is an initiator (group R).

The devices A and B use a single BLE piconet physical channel.

The devices A and C use another BLE piconet physical channel.

In group D, the device D advertises using an advertising event connectable in an advertisement physical channel, and the device A is an initiator. The device A may establish a connection with the device D and add a device to the piconet A.

In group C, the device C advertises on an advertisement physical channel by using a certain type of an advertising event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertising event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertising event connectable on an advertisement physical channel, and the device O is an initiator. The device O may establish a connection with the device R. Here, the device O may be a slave of two devices and a master of one device at the same time.

FIG. 4 is a view illustrating an example of a Bluetooth communication architecture to which the methods proposed in this disclosure may be applied.

Referring to FIG. 4, (a) of FIG. 4 illustrates an example of a protocol stack of a Bluetooth basic rate (BR/enhanced data rate (EDR), and (b) of FIG. 4 illustrates an example of a protocol stack of Bluetooth low energy (LE).

Specifically, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR baseband layer 14, and a link manager 16.

The BR/EDR PHY layer 12 is a layer transmitting and receiving a 2.4 GHz wireless signal, and in case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence hopping 1400 times per second, and transmits a time slot having a length of 625 us for each channel.

The link manager layer 16 controls a general operation (link setup, control, security) of a Bluetooth connection by utilizing a link manager protocol (LMP).

The link manager layer 16 may perform the following functions.

The link manager layer 16 may perform ACL/SCO logical transport, logical link setup, and control.

Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, a security manager (SM) 22, an attribute protocol (ATT) 23, a generic attribute profile (GATT) 24, a generic access profile (GAP) 25, and a BR/EDR profile 26.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The security manager (SM) 22 is a protocol for authenticating a device and providing a key distribution.

The generic attribute profile (GATT) 24 may operate as a protocol for describing how the attribute protocol 23 is used in configuring services. For example, the generic attribute profile 24 may operate how ATT attributes are grouped together with services, and operate to describe features associated with services.

Thus, the GATT 24 and the ATT 23 may use features in order to describe status and services of a device and describe how the features are related and used.

The attribute protocol 23 and the BR/EDR profile 26 define a service (profile) using the Bluetooth BR/EDR and define an application protocol for exchanging data, and the generic access profile (GAP) 25 defines a scheme of discovering and connecting a device and providing corresponding information to the user, and provides privacy.

As illustrated in (b) of FIG. 4, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer (LL) 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include a generic access profile (GAP) 40, a logical link control and adaptation protocol (L2CAP) 41, a security manager (SM) 42, an attribute protocol (ATT) 43), a generic attribute profile (GATT) 44, a generic attribute profile (GAP) 45, and an LE profile 46. However, the host stack 40 is not limited thereto and may include various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

In the Bluetooth LE, three fixed channels (one for a signaling channel, one for a security manager, and one for an attribute protocol) are used.

In contrast, in the BR/EDR, a dynamic channel is used, and a protocol service multiplexer, retransmission, streaming mode, and the like, are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data
② Include: It defines a relationship between services
③ Characteristics: It is a data value used in a server
④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method
② Time: Time information exchanging method
③ FindMe: Provision of alarm service according to distance
④ Proximity: Battery information exchanging method
⑤ Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption may be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertising event, that is, a device which performs advertisement, and is also called an advertiser.

A scanning device refers to a device which performs scanning, that is, a device which sends a scan request.

In the BLE specification, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertising events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertising event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertising events that may be scanned. A Bluetooth device which may be discovered and used by another device is called a discoverable device. A discoverable device actively broadcasts an advertising event so that other devices may scan the discoverable device through an advertising (or broadcast) physical channel.

Both of the discovering device and the discoverable device may already have been connected to other Bluetooth devices in a piconet Connecting Procedure A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertising event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertising events.

Each advertising event includes at least one advertising PDU, and the advertising PDU is transmitted through an advertising channel index. Each advertising event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters a connection state when the device performing the connection request, i.e., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave. The master controls a timing of a connection event and the connection event refers to a time at which the master and the slave are synchronized.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type filed of an advertising channel included in the header supports PDU types defined in Table 1 below.

| 표1 | |
|---|---|
| PDU Type | Packet Name |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: a connectable non-directional advertising event

ADV_DIREC_IND: a connectable directional advertising event

ADV_NONCONN_IND: a non-connectable non-directional advertising event

ADV_SCAN_IND: a non-directional advertising event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by this specification.

FIG. 5 is a diagram illustrating an example of a structure of a generic attribute profile (GATT) of BLE.

Referring to FIG. 5, a structure for exchanging profile data of Bluetooth low energy may be looked through.

Specifically, the GATT defines a method for exchanging data using a service between Bluetooth LE devices and a characteristic.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

A GATT-based operation structure used in the Bluetooth LE may be based on THE profile, the service, and the characteristic, and may have a vertical structure illustrated in FIG. 5.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute The present invention proposes a method in which a sensor measures and stores human activities by using a GATT-based operational structure of the Bluetooth LE, and a client retrieves the stored information from the sensor.

FIG. 6 is a flowchart illustrating a method of establishing a connection using BLE between devices.

As shown in FIG. 6, a first device 300 transmits an advertising message to a second device for BLE connection between the first device 300 and the second device 400 (S6010).

As described above, the advertising message is used to provide its own information to other devices using BLE and may include various information such as service information and user information provided by the device.

The second device 400 checks information included in the advertising message transmitted from the first device 300, transmits a connection request message for requesting BLE connection to the first device 300 (S6020), and the first device 300 and the second device 400 form BLE connection therebetween (S6030).

The Bluetooth standard technology (e.g., Bluetooth Specification V4.0) is divided in core specifications into basic rate/enhanced data rate (BR/EDR) and low energy (LE). Here, BR/EDR is a wireless communication technology applied to many products, while enjoying a market dominant position in short-range wireless personal area network (WPAN) technology.

BLE, which is a technology introduced since the Bluetooth standard V4.0, is designed to be more energy efficient than the existing Bluetooth BR/EDR.

In the present disclosure, a main smart device refers to a device mainly used by the user and may correspond to a TV, a mobile phone, a smartphone, a notebook, and the like. However, this is a relative concept, and various devices may be the main smart device, and in some cases, the main smart device may be a peripheral device which is used adjunctively.

As the services provided by main smart devices such as TVs and smartphones have recently diversified, the number and types of peripheral devices have increased significantly. The main smart device receives a signal transmitted from peripheral devices which are used adjunctively such as a keyboard, a mouse, a speaker, and performs a wireless communication connection.

Here, when the peripheral devices of the main smart device attempts to connect, the main smart device receives a signal transmitted from various peripheral devices and shows the received result to the user through a notification message. In other words, in the existing Bluetooth wireless communication technology, each time the peripheral devices of the main smart device that the user mainly uses attempts to connect, connection information is displayed to the user through a pop-up. As more peripheral devices are used in the main smart device, frequent pop-up guide may cause inconvenience to the user.

Therefore, an object of the present disclosure is to solve this problem and proposes an efficient Bluetooth pairing and notification method in an environment in which a plurality of devices exist.

FIGS. 7 to 9 are diagrams illustrating a transport discovery service (TDS) to which the present disclosure may be applied.

FIG. 7 shows a protocol stack of a BR/EDR connection handover profile. The TDS is one of the Bluetooth profiles designed to efficiently discover a peripheral device. The TDS allows a seeker to acquire various information from a provider for BR/EDR connection handover. As an example, the provider may transmit an advertising message including transport data related to BR/EDR transport to the seeker. Through the transport data, the provider may inform the seeker of a list of services that may be performed using the BR/EDR transport.

FIG. 8 illustrates a format of an advertising message supporting the TDS. Referring to FIG. 8, the advertising message may include a transport discovery data ad type code field and/or a transport block field.

The transport block field may include an organization ID field, a TDS flag field, a transport data length field, and/or a transport data field.

FIG. 9 illustrates a transport data field. Referring to FIG. 9, the transport data may have a LTV (Length, Type, Value) structure. The transport data may include N LTV structures.

Each LTV structure may include a length field and/or a data field, and the data field may include a type field and a value field. A 16-bit service UUID list may be indicated in the type field and two specific service UUIDs may be indicated in the value field.

FIG. 10 is a diagram illustrating an advertising and scanning operation in Bluetooth communication as an embodiment to which the present disclosure may be applied.

Referring to FIG. 10, it is assumed that a first device is a main smart device and receives an advertising message from peripheral devices (second device, third device, and fourth device).

The peripheral devices (second device, third device, and fourth device) may periodically transmit an advertising message for a specific time interval. As shown in FIG. 10, an advertising event may include an advertisement interval and an advertisement delay period. Each advertising event includes at least one advertising PDU, and the advertising PDUs may be transmitted through advertising channel indexes in use.

The first device may receive an advertising message transmitted from the peripheral devices in a scan state. During the scanning state, the first device listens to an advertising message (or advertisement channel index) for a scanWindow duration. The scan interval is defined as an interval between starting points of two consecutive scan windows. The scan interval may include a scan window interval and a sleep interval.

FIG. 11 is a diagram illustrating a problem that may arise as various peripheral devices approach in the existing Bluetooth communication technology.

Referring to FIG. 11, it is assumed that a main smart device is a smart TV and various peripheral devices such as at least one portable speaker, a wireless keyboard, or a wireless mouse exist.

When the smart TV searches for peripheral devices, a notification message may be displayed on the screen each time searching is performed. When a first portable speaker, a second portable speaker, a first wireless keyboard, and a first wireless mouse access the smart TV and transmit an advertising message, four notification messages may be displayed on the screen, as shown in FIG. 11.

As such, if the notification messages are displayed each time the main smart device scans connection information transmitted from the peripheral devices transmitting an advertising message, the user may feel inconvenient to use the main smart device.

FIG. 12 is a flowchart illustrating a pop-up method according to discovery of a peripheral device in the existing Bluetooth communication technology.

Referring to FIG. 12, it is assumed that a first device is a main smart device, and a second device, a third device, and a fourth device are peripheral devices.

The first device receives an advertising message from the second device, the third device, and the fourth device (S12010).

The first device transmits a notification message for notifying a pop-up for the user to the peripheral device. In this case, the first device may transmit the notification message to each peripheral device in order of receiving the advertising message.

Specifically, the first device transmits a notification message for notifying start of a pop-up for connection to the fourth device (S12020). The first device may perform pop-up to notify the user of the fourth device. The first device may terminate the pop-up when a connection denial is received from the user.

Similarly, the first device transmits a notification message for notifying the start of the pop-up for connection to the third device (S12030). The first device may perform pop-up to notify the user of the third device. The first device may terminate the pop-up when the first device receives a connection denial from the user.

The first device transmits a notification message for notifying the start of the pop-up for connection to the second device (S12040). The first device may perform the pop-up to notify the user of the third device. When connection is approved by the user, the first device transmits a connection request message to the second device (S12050).

In other words, in the existing Bluetooth communication, when various peripheral devices approach and transmit an advertising message, pop-up is displayed to the user for all peripheral devices that transmit the advertising message to confirm an intention for connection.

FIG. 13 is a flowchart illustrating a method of discovering a peripheral device and popping up according to an embodiment of the present disclosure.

Referring to FIG. 13, a first device is a smart TV as a main smart device, and a second device, a third device, and a fourth device are a speaker, a wireless keyboard, and a wireless mouse, respectively, as peripheral devices. It is assumed that the user watching a movie using the first device.

In an embodiment of the present disclosure, priorities of the auxiliary devices may be set to be different according to the characteristics of the main smart device or a usage environment. For example, when the user watches a movie using the first device, an audio device may have a relatively high importance among various auxiliary devices, and thus, a relatively high priority may be given to the audio device during the user watches movie.

The first device receives an advertising message from the second device, the third device, and the fourth device (S13010).

The first device gives priority to the peripheral devices according to content filtering (S13020). A content filtering method according to an embodiment of the present disclosure will be described later in detail.

The first device transmits a notification message for notifying start of pop-up for connection to the second device to which the highest priority is given (S13030). The first device may perform pop-up to notify the user of the second device. The first device may transmit a connection request message to the second device according to A connection request input received from the user (S13040).

FIG. 14 is a diagram illustrating an advertising message format according to an embodiment of the present disclosure.

In an embodiment of the present disclosure, the advertising message may include service information supported by a peripheral device. Specifically, the peripheral device which advertises may transmit an advertising message having such a format as illustrated in FIG. 8, and in this case, a transport data field may include information on a service or content supported by the peripheral device.

In an embodiment, the transport data field of the advertising message may include type information of content supported as shown in FIG. 14(b). The content type information may include, for example, audio, video, external input, and/or the like.

FIG. 15 is a diagram illustrating transport data according to an embodiment of the present disclosure.

As described above, the advertising message may include service information supported by the peripheral device. Specifically, the peripheral device which advertises may transmit an advertising message having such a format as illustrated in FIG. 8, and in this case, the transport data field may include information on a service or content supported by the peripheral device.

In an embodiment, the transport data field of the advertising message may include type information of content supported as shown in FIG. 15. For example, the content type may include a TV channel, show (or presentation), game, external input, digital object identifier, music, global release identifier for video, serial, musical work, URI, and/or UUID.

FIG. 16 is a diagram illustrating a method of adaptively adjusting a scan window according to an embodiment of the present disclosure.

Referring to FIG. 16, it is assumed that a first device is a main smart device and receives an advertising message from peripheral devices (second device, third device, and fourth device).

The peripheral devices (second device, third device, and fourth device) may periodically transmit an advertising message for a specific time interval. An advertising event may include an advertisement interval and an advertisement delay interval as shown in FIG. 10 described above. Each advertising event includes at least one advertising PDU, and the advertising PDUs may be transmitted through advertising channel indexes in use.

In an embodiment of the present disclosure, the main smart device may adaptively adjust a scan window according to a priority of the content supported by the peripheral device.

That is, when the main smart device receives an advertising message of a peripheral device having a high content priority, the main smart device may set a time interval of the scan window relatively shorter than a case where an advertising message of a peripheral device having a low priority is received.

Specifically, when the main smart device receives an advertising message of a peripheral device having a high priority, it may be predicted that the user's use of the peripheral device is low, and thus, the main smart device may reduce the time interval of the scan window. In other words, when an advertising message of a peripheral device having a high priority is received, the main smart device may perform scanning using a filtered scan window in which the time interval of the scan window is relatively reduced.

On the contrary, when an advertising message of a peripheral device having a low priority is received, the main smart device may set to increase or maintain the time interval of the scan window.

According to the embodiment of the present disclosure, a low energy operation may be set to be performed by adaptively adjusting the scan window according to the priority of the peripheral device.

FIG. 17 is a flowchart illustrating a priority giving method according to an embodiment to which the present disclosure is applied.

In an embodiment of the present disclosure, the main smart device may allow connection attempt only to a peripheral device belonging to a specific distance range (or a specific area). In an embodiment, the main smart device may be connected to a peripheral device within an effective distance through received signal strength indicator (RSSI) filtering. In this case, the RSSI may be used to determine a received signal strength.

Specifically, the main smart device searches for a peripheral device (S17010). That is, the main smart device scans an advertising message of a peripheral device in the scanning state.

The main smart device determines whether the peripheral device approaches within the predetermined effective distance of the main smart device through RSSI filtering (S17020, S17030). That is, when the peripheral device of the main smart device approaches within a specific effective distance, the main smart device may recognize the corresponding peripheral device as a device which is to connect.

The RSSI value may be obtained using the signal value received by the main smart device from the peripheral device, and the main smart device may know whether the peripheral device has approached within the effective distance based on the received signal value. For example, the main smart device may recognize the distance compared to the reference RSSI value. If a transmission (Tx) power value is included in the advertising message, the main smart device may obtain a reference RSSI value using the transmission power value.

For example, if there are a first device having a transmission power of 10 dbm and a second device having a transmission power of 0 dbm, the main smart device may determine that the second device having a small transmission power is closer to the main smart device than the first device even though RSSI values are equal or similar.

If a peripheral device does not approach within the effective distance, the main smart device searches for a peripheral device again.

If a peripheral device approaches within the effective distance, the main smart device performs content filtering on the approaching peripheral device (S17040). The main smart device may give priority to the peripheral device based on a characteristic of the peripheral device or a content type supported by the peripheral device through content filtering. A specific method thereof will be described later in detail.

As a result of the content filtering, it is determined whether the peripheral device has a predetermined priority or higher or has a higher priority than a previously connected device (S17050). If the priority is not higher, the main smart device outputs a notification message indicating that the device has been searched on the screen (S17060).

If the priority is higher, the main smart device determines whether the user wants to be connected via a pop-up (S17070). If an intention of connection rejection is received from the user as a result of the determination, the main smart device may exclude the peripheral device from a search list for a predetermined time (S17080). Through this, it is possible to prevent a pop-up message from being continuously displayed even if the user does not want to connect.

Meanwhile, when an intention for connection is received from the user, the main smart device is connected to the corresponding peripheral device (S17090).

In an embodiment, the main smart device may set the number of scan windows or RSSI data samples to be different according priorities of the searched peripheral devices.

For example, a scan window may be set to be short and the number of RSSI data samples may be set to be small for a high priority device for fast connection.

Hereinafter, the content filtering operation will be described. Referring back to FIG. 13, the first device, which is the main smart device, may receive an advertising message from a plurality of devices. The first device may display a pop-up notification for connection of a device having the highest priority given through content filtering among the plurality of devices.

In an embodiment, the main smart device may give a priority according to a type of content supported by the peripheral device. For example, the content may be content such as a music channel, a YouTube, a video, a PPT, the Internet, and the like, and a priority may be predetermined (or assigned) for each content.

In addition, in an embodiment, the main smart device may assign a priority according to a type of the peripheral device. For example, the type of device may include an audio device (e.g., a speaker, a headset, etc.), an input device (e.g., a keyboard, a mouse, etc.), and other devices (e.g., a game joystick, etc.).

In addition, in an embodiment, the device priority according to the type of content may be designated by a user or a manufacturer. A default ranking may be set and other rankings may be added or changed. Priority may be determined according to a characteristic of a device or supported content based on a usage environment. For example, in a usage environment using a music channel, a YouTube, a video, and the like, an audio device may be set to a first ranking, an input device (HID) to a second ranking, and other devices to a third ranking. Meanwhile, in a usage environment using PPT or the Internet, an input device may be set to a first ranking, an audio device to a second ranking, and other devices to a third ranking.

Further, in an embodiment, higher priority may be given to a device which transmitted an advertising message scanned first if the rankings are equal. If the rankings are equal and an advertising message is simultaneously scanned, a device registered in a white list may be registered as having priority.

In step S13020 of FIG. 13 described above, since the first device is watching a movie, the audio device may be given the highest priority m. When it is assumed that the second device is a speaker, the third device is a wireless keyboard, and the fourth device is a wireless mouse, the second device, which is an audio device, may be given the highest priority, and although the third device and the fourth device are input devices having the same ranking, the fourth device which first received the advertising message may be given a higher priority than the third device.

FIGS. 18 to 19 are diagrams showing an example of a usage scenario according to an embodiment of the present disclosure.

Referring to FIG. 18, when the smart TV receives an advertising message of a peripheral device (second portable speaker) existing within the predetermined effective distance range, a pop-up notification is displayed on the screen to confirm the user's intention to connect. As described above, whether the peripheral device is within the effective distance range may be determined using the RSSI value.

Meanwhile, even when an advertising message of a peripheral device (first portable speaker) that exists outside the effective distance range is received, the smart TV does not display a pop-up notification on the screen.

Referring to FIG. 19, when the smart TV receives advertising messages from two or more peripheral devices existing within the predetermined effective distance range, the smart TV may perform content filtering. In FIG. 19, since the Internet is used in the environment, a higher priority may be given to the input device (e.g., a wireless mouse or a wireless keyboard) than the audio device. Therefore, when advertising messages are received from the input device (first wireless keyboard) and the audio device (second portable speaker) existing within the effective distance range, the smart TV displays a pop-up notification for confirming the user's intention for connection on the screen only for the input device having a higher priority. Meanwhile, a pop-up notification for the second portable speaker which is an audio device is not displayed on the screen.

FIG. 20 is a flowchart illustrating an example of a usage scenario according to an embodiment of the present disclosure.

Referring to FIG. 20, the first device receives an advertising message from the second device and the third device (S20010). Here, the advertising message may include address, name, and preferred content information of each device.

The first device performs RSSI filtering (S20020). Here, it is assumed that the second device is within the effective distance range and the third device is outside the effective distance range. A result that an RSSI value of the second device is smaller than a predetermined RSSI threshold and an RSSI value of the third device is greater than the predetermined RSSI threshold may be confirmed based on the RSSI filtering of the first device.

The first device gives a priority according to content filtering (S20030) and determines whether to connect through a pop-up notification (S20040). Also, the first device requests connection to the second device according to a user's intention.

FIG. 21 is a diagram illustrating a method of establishing connection through an advertisement including content type information according to an embodiment to which the present disclosure may be applied.

Referring to FIG. 21, the first device receives an advertising message from at least one adjacent device (S21010). As described above, the advertising message may include information on a content type supported by at least one adjacent device.

As described above, the content type may include audio, video, or an external input. As another example, the content type may include a TV channel, a show, a game, an external input, a digital object identifier, music, a global release identifier for video, a serial, music work, URI or UUID information.

The first device transmits a notification message for notifying a pop-up for the user of the first device to at least one adjacent device based on the advertising message (S21020).

As described above, the first device may adaptively adjust a size of a scan window in a scanning state based on a priority determined according to a content type.

In addition, as described above, the first device may give priority to the adjacent device based on the content type. In an embodiment, when the first device receives advertising messages from a plurality of devices, the first device may transmit a notification message for notifying a pop-up for connection to a device having the highest priority among the plurality of devices. For example, as described above, the priority may be determined according to a usage environment of the first device or a content type supported by the at least one adjacent device.

In addition, as described above, the first device may determine whether an adjacent device approaches within an effective distance range by using a received signal strength indicator (RSSI). Depending on a result of the determination, a pop-up notification may be displayed to the user only for a device which has approached within the effective distance range.

The first device transmits a connection request message requesting connection to at least one adjacent device according to a user input (S21030).

The present disclosure described above may be variously replaced, modified, and changed by those skilled in the art to which the present invention pertains without departing from the scope of the technical concept of the present invention, and thus are not limited to the aforementioned embodiments and accompanying drawings.

INDUSTRIAL APPLICABILITY

The preferred embodiments of the present disclosure described above are disclosed for an exemplary purpose, and modifications, changes, substitutions, or additions of various other embodiments may be hereinafter made by those skilled in the art within the technical spirit and the technical scope of the present invention disclosed in the appended claims.

The invention claimed is:

1. A method of connecting to an adjacent device in a wireless communication system using Bluetooth low energy (LE), the method performed in a first device comprising:
   receiving an advertising message from at least one adjacent device, the advertising message including information on a content type supported by the at least one adjacent device;
   transmitting a notification message for notifying a pop-up for a user of the first device to the at least one adjacent device based on the advertising message; and
   transmitting a connection request message requesting connection to the at least one adjacent device according to an input of the user.

2. The method of claim 1, wherein the content type comprises audio, video, or an external input.

3. The method of claim 1, wherein the content type comprises a TV channel, a show, a game, an external input, a digital object identifier, music, a global release identifier for video, a serial, music work, URI or UUID information.

4. The method of claim 1, further comprising:
   adaptively adjusting a size of a scan window in a scanning state based on a priority determined according to the content type.

5. The method of claim 1, further comprising:
   giving priority to the at least one adjacent device based on the content type.

6. The method of claim 5, wherein
   the transmitting of the notification message to the at least one adjacent device comprises:
   transmitting, if the advertising message is received from a plurality of devices, a notification message notifying a pop-up for connection to a device given a highest priority among the plurality of devices to the device given the highest priority.

7. The method of claim 6, wherein the priority is determined according to a usage environment of the first device or the content type supported by the at least one adjacent device.

8. The method of claim 1, further comprising:
   determining whether the at least one adjacent device approaches within an effective distance range using a received signal strength indicator (RSSI).

9. A device as a first device for connecting with an adjacent device in a wireless communication system using Bluetooth low energy (BLE), the device comprising:
   a communication unit wirelessly or wiredly communicating with an external device; and
   a processor operatively connected to the communication unit,
   wherein
   the processor receives an advertising message from at least one adjacent device, the advertising message including information on a content type supported by the at least one adjacent device,
   transmit a notification message for notifying a pop-up for a user of the first device to the at least one adjacent device based on the advertising message, and
   transmit a connection request message requesting connection to the at least one adjacent device according to an input of the user.

* * * * *